United States Patent [19]
Matsudaira et al.

[11] 3,969,901
[45] July 20, 1976

[54] FLOATING BREAKWATERS

[75] Inventors: Tadashi Matsudaira, Tokyo; Yoshihiro Mishina, Matsudo, both of Japan

[73] Assignee: Ishikawajima-Harima Jukogyo Kabushiki Kaisha, Tokyo, Japan

[22] Filed: Aug. 23, 1974

[21] Appl. No.: 500,178

[30] Foreign Application Priority Data
Aug. 28, 1973  Japan............................. 48-95769
Sept. 26, 1973  Japan............................. 48-107534

[52] U.S. Cl. ................................................ 61/5
[51] Int. Cl.² ........................................ E02B 3/04
[58] Field of Search ................... 61/5, 4, 1, 1 F, 2, 61/3

[56] References Cited
UNITED STATES PATENTS 2,658,350   11/1953   Magill ....................................... 61/5
3,222,870   12/1965   Miller et al. ............................. 61/5
3,848,419   11/1974   Bowley ..................................... 61/5

Primary Examiner—Jacob Shapiro
Attorney, Agent, or Firm—Scrivener Parker Scrivener & Clarke

[57] ABSTRACT

A floating breakwater is disclosed which comprises a plurality of floating breakwater units interconnected with each other in side by side relation and anchored to the sea bottom with anchor cables or chains. Each floating breakwater units comprises a center float, a front and rear barrier joined thereto with connecting members in suitably spaced apart relation or directly joined to the center float so as to define the separated spaces therebetween. The pitching, heaving and surging of the floating breakwater may be minimized, and the waves of a relatively wide range of wave lengths may be effectively reflected and depressed or abated so that a safe and comparatively calm sea space may be provided behind the floating breakwater.

8 Claims, 7 Drawing Figures

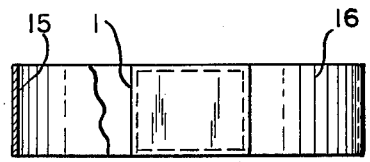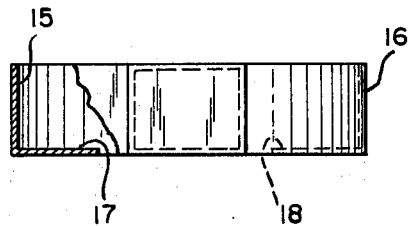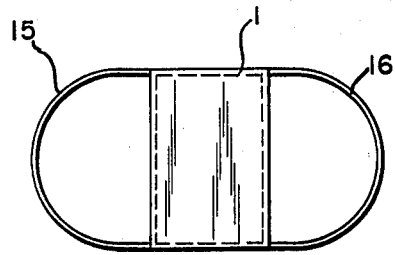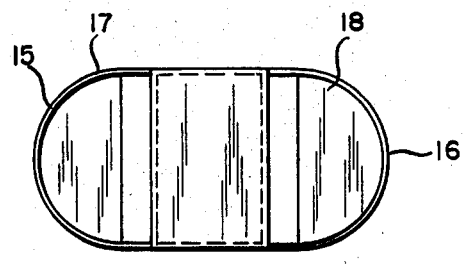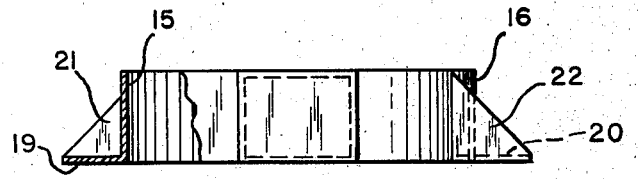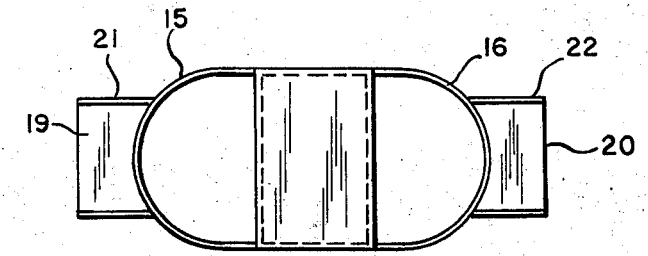

FLOATING BREAKWATERS

DETAILED DESCRIPTION OF THE INVENTION

The present invention relates to floating breakwaters which may be installed at the entrance of a bay or in front of a fishery farm in order to conserve or protect and culture the fishes, shellfishes and sea weeds, or around an installation such as an oil relay base or airport constructed in the sea, or as a temporary breakwater for the anchorage of yachts or protecting the beaches such as a swimming beach or for providing a safe and comparatively calm sea space for the construction of an installation above or below the seal level.

The conventional floating breakwaters may be divided into the bundled type, the net type and the pontoon type. In the bundled type, many plastic pipes are bundled with ropes into a form of a blind, and the upper end pipes are floated by buoys while the lower end pipes are anchored with anchor cables or the like to weights placed on the sea bottom. A floating breakwater of this type has a distinct defect that the plastic pipes tend to be loosened by the waves. In the net type floating breakwater, the upper side of a suitable net is attached to a group of fiber-reinforced plastic pipes while the lower side to steel pipes, and the buoys and weights are also used. The net type floating breakwater has also a distinct defect that the meshes of the net are clogged with the sea weeds so that the net exhibits much resistance to the water. As a result the net is broken or torn off. In the pontoon type, many relatively large-sized pontoons made of concrete or steel are connected with ropes or the like to each other in side by side relation and are anchored to the sea bottom with anchor cables or the like. Since the pontoon is a floating body, it has too strong a righting moment so that it tends to pitch, following the motion of the wave. Therefore the pontoon type floating breakwater is effective to the waves of a relatively short wave length, but is ineffective to the waves of a long wave length and large scale mooring system is necessary. Furthermore, the manufacturing cost of the pontoons themselves is quite high.

In view of the above, the primary object of the present invention is to provide an improved floating breakwater which may be held substantially at rest against the waves of expected periods without causing pitching, and which may very effectively reflect and depress or abate the waves of a wide range of wave lengths. Another object of the present invention is to provide a floating breakwater of simple, yet rigid construction and inexpensive to manufacture.

The above and other objects, features and advantages of the present invention will become more apparent from the following description of the preferred embodiments thereof taken in conjunction with the accompanying drawing, in which:

FIGS. 2 and 3 are diagrammatic side and top views of a second embodiment of the present invention;

FIGS. 4 and 5 are diagrammatic side and top views of a third embodiment of the present invention; and FIGS. 6 and 7 are diagrammatic side and top views of a fourth embodiment of the present invention.

FIRST EMBODIMENT; FIG. 1

Figure 1:
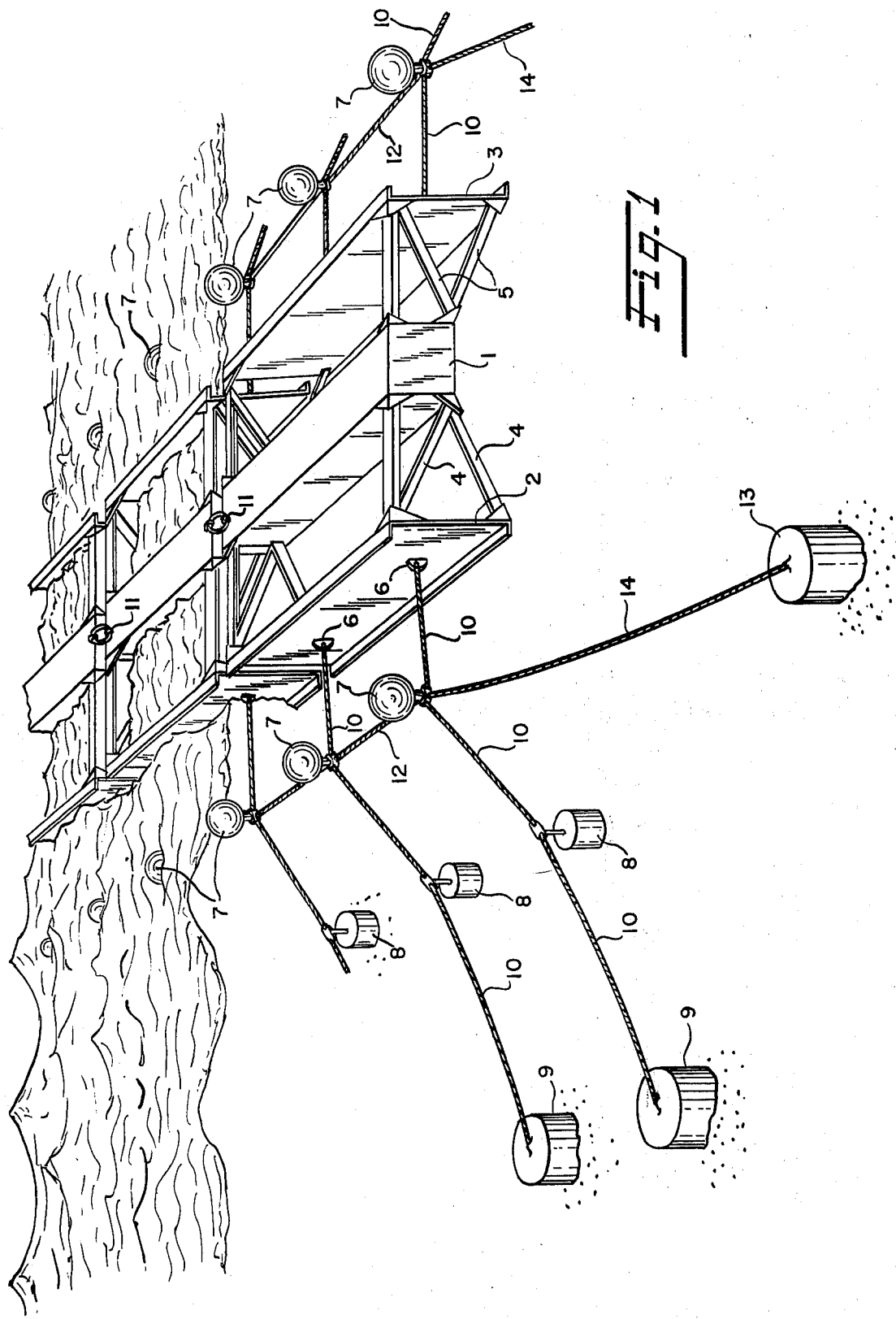
FIG. 1 is a schematic view of a first embodiment of a floating breakwater in accordance with the present invention.

Referring to FIG. 1, each floating breakwater unit consists of a float 1, and a front and rear barriers 2 and 3 joined to the float 1 with connecting members 4 and 5 and spaced apart from the float 1 by a suitable distance. In the instant embodiment the float 1 is of a steel-plate-box type, and the front and rear barriers 2 and 3 are made of steel plates. Alternatively, they may be made of any suitable material such as concrete, synthetic resins, and so on. In order to prevent the inroads of sea water into the float 1, foam plastic with closed (nonintercommunicating) cells may be filled into the float 1. The depth of the barriers 2 and 3 and their spacings from the float 1 are determined depending upon wave heights and wave length to be depressed or abated, but it is not necessary that the front and rear barriers 2 and 3 are arranged symmetrically with respect to the float 1.

One ends of flexible anchor cables or chains 10 are fixed to anchor brackets 6 firmly attached to the outer surfaces of the front and rear barriers 2 and 3 while the other ends of the anchor cables or chains 10 are securely fixed to anchor blocks 9 firmly anchored to the sea bottom. If required, buoys 7 and weights 8 may be attached to the anchor cables or chains 10.

In the first embodiment, two anchor cables or chains 10 are fixed to the two anchor brackets 6 of the front barrier 2 in parallel with each other, but the anchor cables or chains 10 may interconnect between the two brackets 6 and one buoy 7 in the shape of V, and this one buoy 7 may be connected with one anchor cable or chain 10 to one anchor block 9. It is equally true in the mooring of the rear barrier 3. Furthermore suitable connecting means may be slidably fitted over the anchor cables or chains 10 so that the positions of the buoys 7 and the weights 8 attached through these connecting means to the anchor cables or chains 10 may be suitably changed depending upon the installation conditions. The weights 8 is damping weights. Their work are to lighten the impact force loading to the mooring ropes when the floating breakwater units move.

The adjacent floating breakwater units are interconnected with suitable interconnecting means 11 in such a way that they may be moved independently from each other to some extent and may be prevented from colliding against and parting from each other. In like manner, the adjacent buoys 7 are interconnected with a suitable connecting member such as rope, chain or bar so that they may be normally spaced apart from each other by a desired distance. The buoys 7 are further connected to an auxiliary anchor block 13 with a transverse anchor cable or chain 14. Thus the floating breakwater in accordance with the present invention is assembled and firmly held in position.

SECOND EMBODIMENT; FIGS. 2 AND 3

In the second embodiment shown in FIGS. 2 and 3, front and rear barriers 15 and 16 have a semielliptical cross sectional configuration and are directly joined to the float 1 so that the connecting members 4 and 5 in the first embodiment may be eliminated. The floating breakwater unit of the second embodiment may be anchored in a manner substantially similar to that described hereinbefore.

THIRD EMBODIMENT; FIGS. 4 AND 5

The third embodiment shown in FIGS. 4 and 5 is substantially similar in construction to the second embodiment except that bottom plates 17 and 18 are partly attached to the front and rear barriers 15 and 16, respectively, so that the bottom plates 17 and 18 may exhibit the resistance of the body's vertical motion against the vertical motion of the waves.

FOURTH EMBODIMENT; FIGS 6 AND 7

The fourth embodiment shown in FIGS. 6 and 7 is also substantially similar in construction to the second embodiment except that outwardly extending resisting plates 19 and 20 are fixed to the lower side edges of the front and rear barriers 15 and 16 and are reinforced with brackets 21 and 21, respectively. The resisting plates 19 and 20 also exhibit the resistance to the motion in the vertical direction of the waves, and the third and fourth embodiments may be firmly anchored in a manner substantially similar to that described hereinbefore.

In general, as described hereinbefore, each unit of the floating breakwaters in accordance with the present invention comprises a float, a front barrier, a rear barrier, and anchor cables or chains so that the floating breakwaters of the present invention are simple, yet rigid in construction and inexpensive to manufacture, and have the excellent wave abating capabilities which may be summarized as follows:

1. The float is arranged at the center of the floating breakwater unit so that its righting moment about the lateral axis may be minimized. Furthermore, the front and rear barriers, that is masses, are spaced apart from the float forwardly and backwardly, so that the moment of inertia about the lateral axis of the unit may be maximized. Consequently the period of the pitching of the floating breakwater unit becomes sufficiently longer and will not resonate with the waves, and the front and rear barriers are held as if they were directly anchored to the sea bottom so that the waves with a wider range of wave lengths may be very effectively depresssed or abated.
2. The spacings between the front and rear barriers and the float may be changed depending upon the wave lengths of the waves to be depressed or abated while the height or depth below the sea level of the front and rear barriers may be made sufficiently greater relative to the wave heights of the waves to be depressed or abated. Therefore the floating breakwater of the optimum dimensions for the waves to be depressed or abated may be readily designed.
3. The waves are depressed or abated in three stages, that is the front barrier, the center float, and the rear barrier so that the energy of the waves is gradually dissipated. The high energy portion of the onrush wave closer to the surface of the sea is effectively reflected by the front barrier, and the major portion of the remaining wave advances below the front barrier while the minor portion overrides the front barrier. The energy of the major portion advanced below the front barrier is distributed to the surface of the sea so that it may be effectively reflected and dissipated by the center float. The energy of the wave advanced below the center float is again reflected and dissipated by the rear barrier effectively in the same way. The wave overriding the front barrier breaks so that almost all of its energy is dissipated. The remaining wave is also reflected and abated by the float. In like manner the wave overriding the float is reflected and abated by the rear barrier. Therefore the wave overriding the front barrier has very little chance to override the rear barrier. The above described wave reflecting and depressing actions of the floating breakwater unit is more pronounced especially in case of the second, third, and fourth embodiments in which the spaces between the front and rear barriers and the center float are confined.

In case of the third and fourth embodiments, the flow or movement of the sea water closer to the floating breakwater is effectively prevented by the bottom or resisting plates. Therefore it seems as if the front and rear masses of the floating breakwater were increased and the moment of inertia of the floating breakwater unit were increased. Thus the motion of the floating breakwater may be minimized.

What is claimed is:

1. A floating breakwater comprising a plurality of floating breakwater units interconnected in side by side relation with each other, each of said floating breakwater units including a float, a front and rear barrier joined to the front and rear sides of said float in forwardly and backwardly spaced apart relation therewith, respectively, and anchor cables for mooring said floating breakwater unit to anchor blocks.

2. A floating breakwater as defined in claim 1 wherein said plurality of floating breakwater units are interconnected side by side through connecting means which serve to prevent the adjacent floating breakwater units for colliding against and parting from each other.

3. A floating breakwater as defined in claim 1 wherein said front and rear barriers are directly joined to said float of each floating breakwater unit so that enclosed spaces may be defined between said floats and said front and rear barriers, respectively.

4. A floating breakwater as defined in claim 1 wherein inwardly extending bottom plates are attached to the lower side edges of said front and rear barriers so that the relative vertical motions between the sea water and said front and rear barriers may be restricted.

5. The floating breakwater of claim 3 wherein said front and rear barriers have a semi-elliptical cross-sectional configuration.

6. The floating breakwater of claim 1 wherein outwardly extending resisting plates are attached to the lower side edges of said front and rear barriers so that the relative vertical motion between the sea water and said front and rear barriers may be restricted.

7. The floating breakwater of claim 5 wherein inwardly extending bottom plates are attached to the lower side edges of said front and rear barriers so that the relative vertical motion between the sea water and said front and rear barriers may be restricted.

8. The floating breakwater of claim 5 wherein outwardly extending resisting plates are attached to the lower side edges of said front and rear barriers so that the relative vertical motion between the sea water and said front and rear barriers may be restricted.

* * * * *